United States Patent [19]

Kleinschmitt

[11] 4,383,754
[45] May 17, 1983

[54] MULTI-BOUNCE, FOLDED PATH SCANNING SYSTEM

[75] Inventor: David Kleinschmitt, Bethel, Conn.
[73] Assignee: Pitney Bowes Inc., Stamford, Conn.
[21] Appl. No.: 323,154
[22] Filed: Nov. 20, 1981
[51] Int. Cl.³ .................... G03G 15/28; G03G 15/32
[52] U.S. Cl. .............................. 355/8; 355/11; 355/51; 355/66
[58] Field of Search ............ 355/51, 8, 11, 47, 66; 350/6.5, 299; 352/84, 111

[56] References Cited

U.S. PATENT DOCUMENTS 3,531,183  9/1970  Aagard .............................. 350/299

FOREIGN PATENT DOCUMENTS 566227  9/1977  U.S.S.R. .............................. 355/8

Primary Examiner—Monroe H. Hayes
Attorney, Agent, or Firm—Lawrence E. Sklar; William D. Soltow, Jr.; Albert W. Scribner

[57] ABSTRACT

A multi-bounce, folded path scanning system, including a first and second pair of stationary tracks, the second pair of tracks being angled with respect to the first pair of tracks, and a movable carriage slidably mounted on the first pair of stationary tracks. The system further includes a first mirror fixedly mounted on the movable carriage, a second mirror slidably mounted on the second pair of stationary tracks and opposing the first mirror and forming an acute angle therewith, the mirrors being separated by a predetermined distance, whereby one end of the mirrors is more open than the other end of the mirrors, an input light ray entering at the more open end of the mirrors and incident upon the first mirror at a predetermined angle, wherein the ray is reflected off each mirror a predetermined multiplicity of times and exits the mirrors at the more open end, and means for translating the first and second mirrors, wherein the predetermined distance between the mirrors increases as the mirrors are translated while the correct angular relationship between the mirrors is maintained.

4 Claims, 7 Drawing Figures

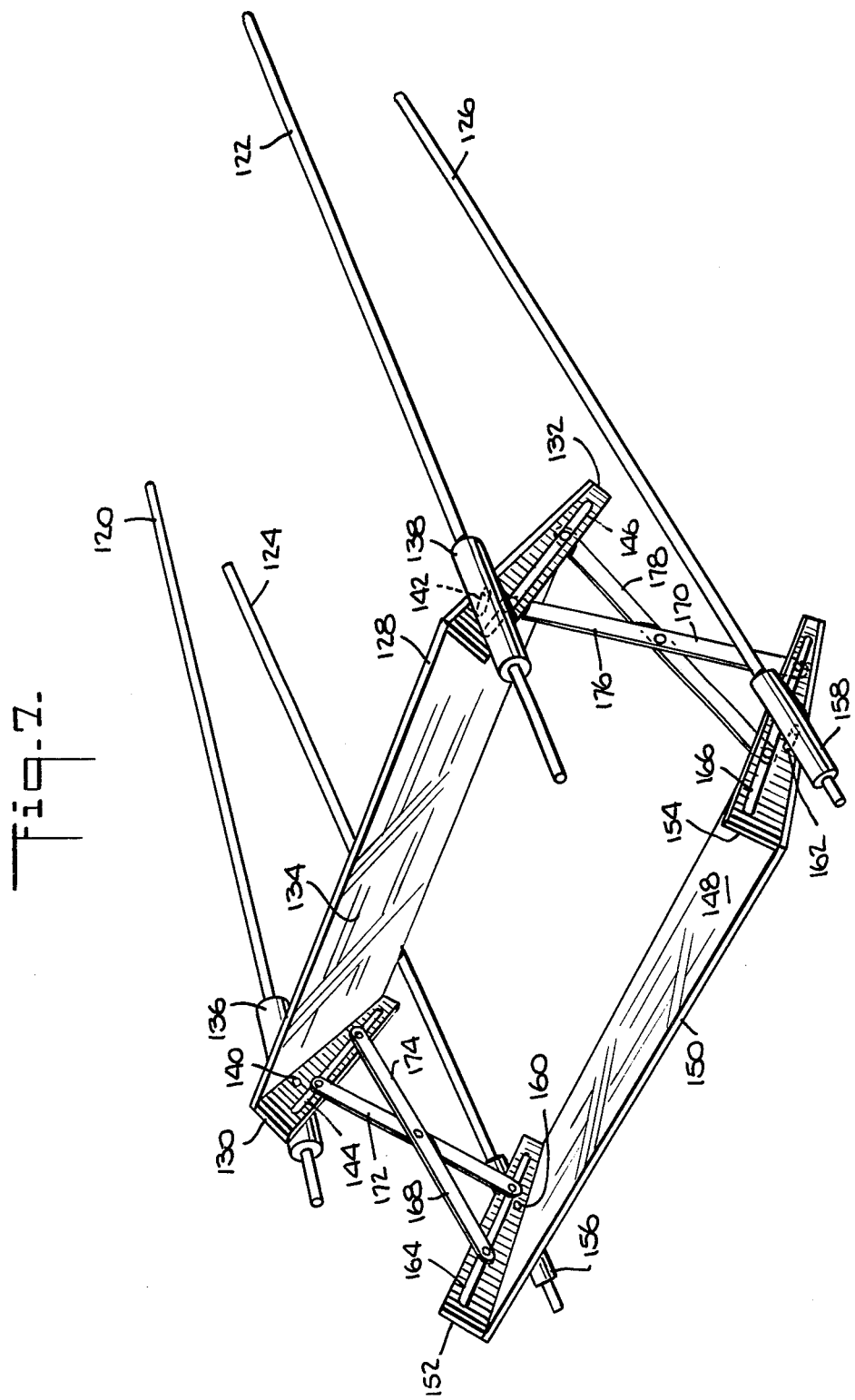

MULTI-BOUNCE, FOLDED PATH SCANNING SYSTEM

BACKGROUND OF THE INVENTION

The instant invention relates to an optical path folding system and more particularly to such a system utilizing a pair of mirrors forming an acute angle therebetween for compact packaging of scanning devices or line imaging optical systems.

There are many applications in which it is desirable to decrease the length of an optical path, the primary reason being to reduce the space needed for an optical system ensconced in a larger piece of equipment. One example of the need for conserving space is the modern electrophotocopier, in which a complex and bulky optical system is utilized to project an image of an original document onto a photoconductive surface. Photocopiers can be made considerably smaller if their optical systems can be reduced in size. It is similarly desirable to shorten the required separation between a scanning mechanism such as a laser scanner, and a scanned surface, or between a lens and a line image or object.

One device which serves to shorten the required separation between the various elements in an optical system is an optical path folding system including a first mirror and a second mirror opposing the first mirror and forming an acute angle therewith, the mirrors being separated by a predetermined distance, whereby one end of the mirrors is more open than the other end of the mirrors, as described in co-pending patent application Ser. No. 311,696 filed Oct. 15, 1981 and assigned to Pitney Bowes Inc.

When the separation between the mirrors described hereinabove is increased, the optical path length between the two mirrors increases at a faster rate than the separation. If such a pair of mirrors is moved on a traveling carriage so that the distance moved were compensated for by changing the mirror separation, a great distance of carriage travel could be compensated for with a relatively small change in mirror separation.

The instant invention accordingly provides a mechanical means of insuring accurate mirror alignment and separation throughout the carriage travel.

SUMMARY OF THE INVENTION

A multi-bounce, folded path scanning system is provided, which comprises a first and second pair of stationary tracks, the second pair of tracks being angled with respect to the first pair of tracks, a movable carriage slidably mounted on said first pair of stationary tracks, a first mirror fixedly mounted on said movable carriage, and a second mirror slidably mounted on said second pair of stationary tracks and opposing said first mirror and forming an acute angle therewith, said mirrors being separated by a predetermined distance, whereby one end of said mirrors is more open than the other end of said mirrors. The scanning system also includes an input light ray entering at the more open end of the mirrors and incident upon said first mirror at a predetermined angle, wherein said ray is reflected off each mirror a predetermined multiplicity of times and exits said mirrors at the more open end, and means for translating said first and second mirrors, wherein the predetermined distance between the mirrors increases as the mirrors are translated while the correct angular relationship between the mirrors is maintained.

BRIEF DESCRIPTION OF THE DRAWINGS

FIG. 7 is a perspective view of the embodiment shown in FIG. 6;

DETAILED DESCRIPTION OF THE INVENTION

Figure 1:
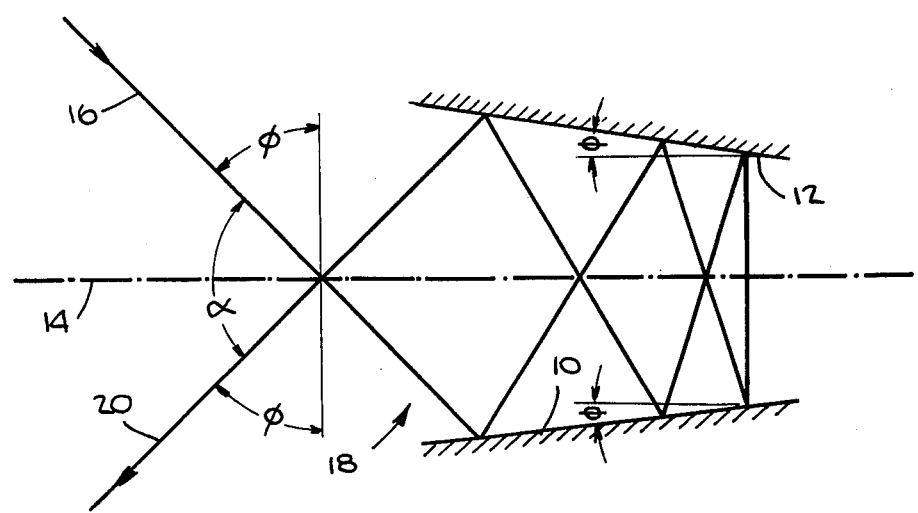
FIG. 1 is a schematic, side elevational view of the mirrors used in the folded path scanning system of the instant invention.

In describing the preferred embodiments of the instant invention, reference is initially made to FIG. 1, in which there is seen a first mirror 10 and a second mirror 12 opposing the first mirror 10 and separated therefrom by a predetermined distance. A center line 14 is indicated between the opposing mirrors 10 and 12, and each of the mirrors 10 and 12 forms an acute angle $\theta$ with the center line 14.

An input light ray 16 from a bundle of light rays (not shown) is provided by any conventional means at a predetermined angle $\phi$ which is the angle between the input ray 16 and a plane perpendicular to the center line 14. The relationship between the angles $\theta$ and $\phi$ is as follows:

$$\theta = \phi/n$$

where n represents the total number of times the input ray 16 bounces off the two mirrors 10 and 12. For the arrangement illustrated in FIG. 1, n would be 6, $\theta$ is 45 degrees, and $\theta$ is 7.5 degrees.

In the instant invention, the lower limit of n is 4, inasmuch as the input ray 16 must bounce off each of the mirrors 10 and 12 at least twice in order to take advantage of the unique and useful compacting characteristics of the folding system described. The practical upper limit for n is primarily determined by the acceptable reflective losses and optical degradations associated with the optical quality of the mirrors 10 and 12.

The angle $\phi$ is limited in smallness by the interference caused by the mirror 12 and the input ray 16 which, in actual use, will be a bundle of rays. As angle $\phi$ is reduced, the input ray 16 approaches the edge of mirror 12 until some angle at which the edge of mirror 12 intersects the input bundle causing unacceptable loss. Angle $\phi$ may be as large as 90 degrees, at which point the input and output rays shown would be parallel. The user of the instant invention would determine the degree of deviation acceptable or desirable between the input rays 16 and exit rays 20.

The input light ray 16 enters the space between the mirrors 10 and 12 at the more open end 18 and also exits the mirrors 10 and 12 at the more open end 18 as illustrated by the exit light ray 20. The exit ray 20 exits the more open end 18 at the same angle $\phi$ as the input ray 16, but on the opposite side of the center line 14, with the exit ray 20 forming an angle $\alpha$ with the input ray 16 such that $\alpha = 180 - 2\phi$. The exit ray 20 finally strikes a lens 21.

Figure 2:
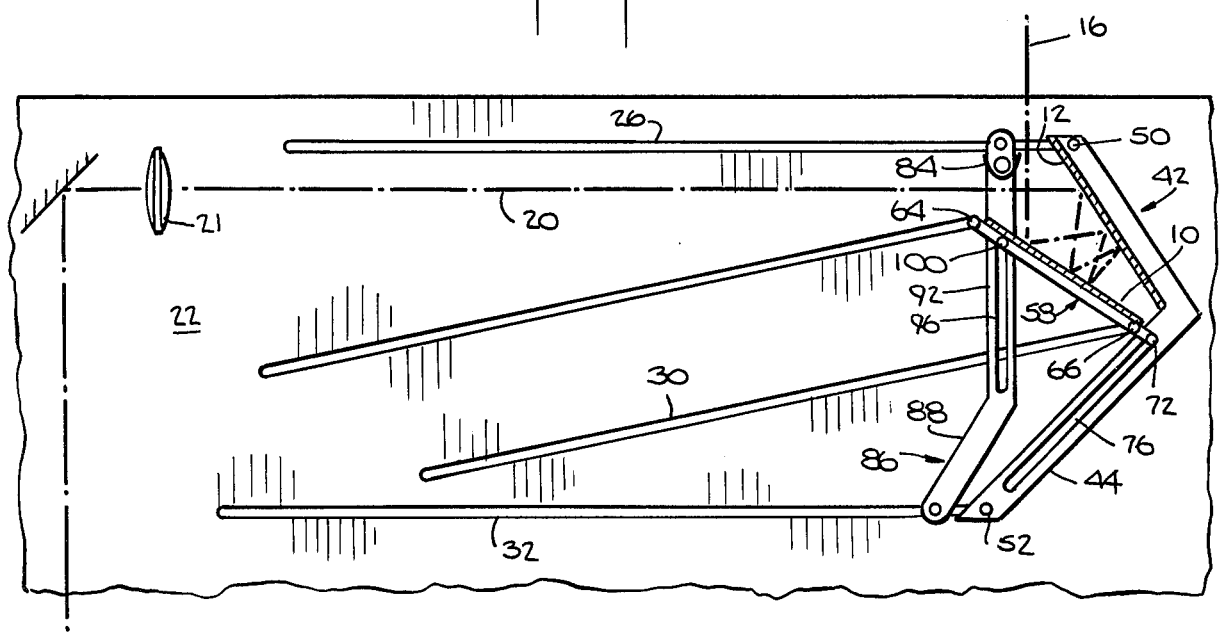
FIG. 2 is a vertical sectional view of one embodiment of the instant invention showing the mirrors close together at the beginning of a cycle.
Figure 3:
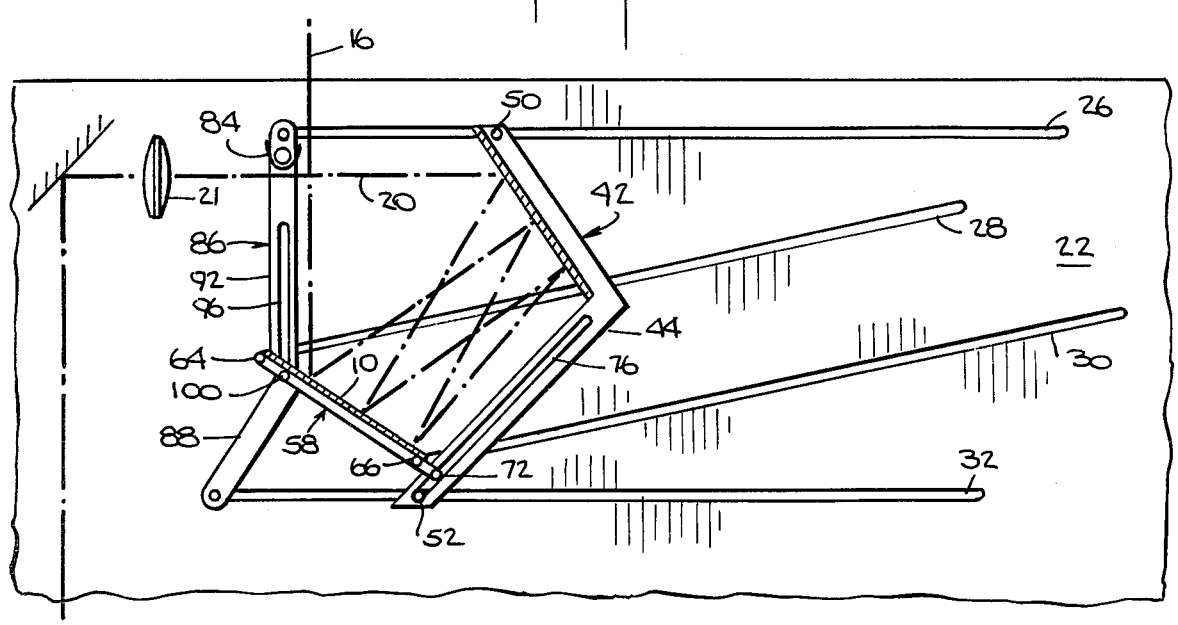
FIG. 3 is the same as FIG. 2 except it shows the mirrors further apart at the end of the cycle.
Figure 4:
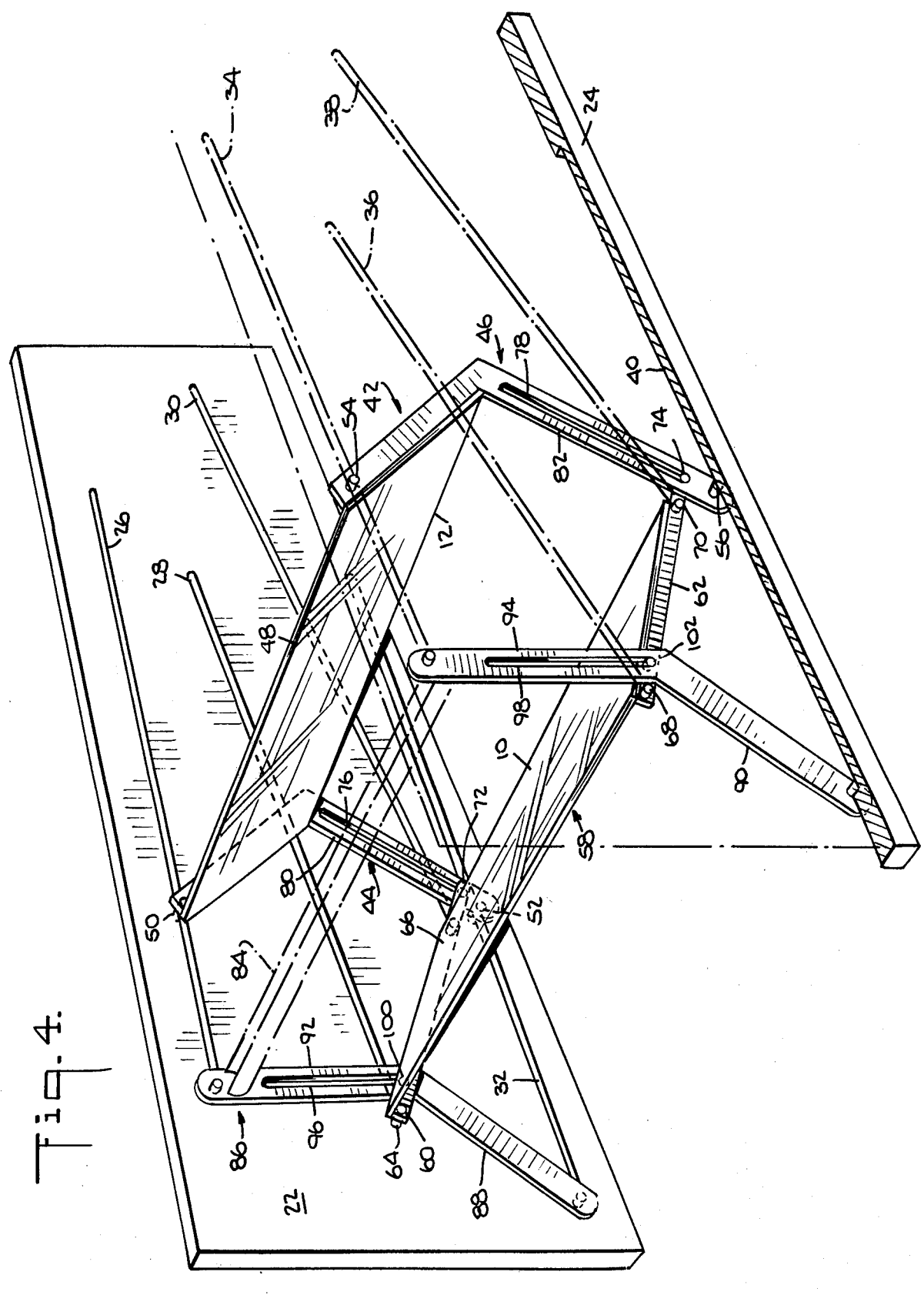
FIG. 4 is a partially broken away, perspective view of the embodiment shown in FIG. 3.

Having set forth the alignment of the mirrors 10 and 12 used in the multi-bounce, folded path scanning system of the instant invention, reference is now made to FIGS. 2-4, in which there is seen a pair of supporting sidewalls 22 and 24. The sidewall 22 includes slots or tracks 26, 28, 30, and 32, while the sidewall 24 includes slots or tracks 34, 36, 38 and 40. A movable carriage 42 consisting of a pair of angled arms 44 and 46 supporting and flanking either side of a rectangular plate 48 (see FIG. 4) rides in the horizontal tracks 26, 32, 34 and 40 by means of pins 50 and 52, which ride in the horizontal tracks 26 and 32 respectively and pins 54 and 56 which ride in the horizontal tracks 34 and 40 respectively. The second mirror 12 is secured to the underside of the rectangular plate 48.

The first mirror 10 is secured to the top side of a second rectangular plate 58 mounted on a pair of brackets 60 and 62. Each of the brackets 60 and 62 includes a pair of pins 64 and 66, and 68 and 70 respectively which ride in angled tracks 28, 30, 36 and 38 respectively. Furthermore, the brackets 60 and 62 each include additional pins 72 and 74 respectively which ride in slots 76 and 78 respectively located in the lower sections 80 and 82 of the angled arms 44 and 46 respectively.

A document illuminator 84 for use with a photocopying machine (not shown) is shown (see FIGS. 2 and 3) secured to an illuminator support 86 consisting of opposed supporting arms 88 and 90 each having upper sections 92 and 94 respectively. Each of the upper sections 92 and 94 has a channel 96 and 98 respectively for receiving pins 100 and 102 respectively extending from the brackets 60 and 62 respectively.

In operation, two opposing mirrors 10 and 12 are spaced relatively close together at the beginning of a cycle as seen in FIG. 2. The movable carriage 42 is then caused to be translated along the horizontal tracks 26, 32, 34 and 40 to the left to the position shown in FIGS. 3 and 4 by conventional means (not shown). The motion of the carriage 42 drives the mirror 10 simultaneously along the angled tracks 28, 30, 36 and 38 and the slots 76 and 78 in the movable carriage 42, thereby insuring the correct angular and positional relationship between the two mirrors 10 and 12. The illuminator support 86 is driven by the mirror 10, and maintains the correct positional relationship for the illuminator 84 to illuminate the scanned document (not shown).

Figure 5:
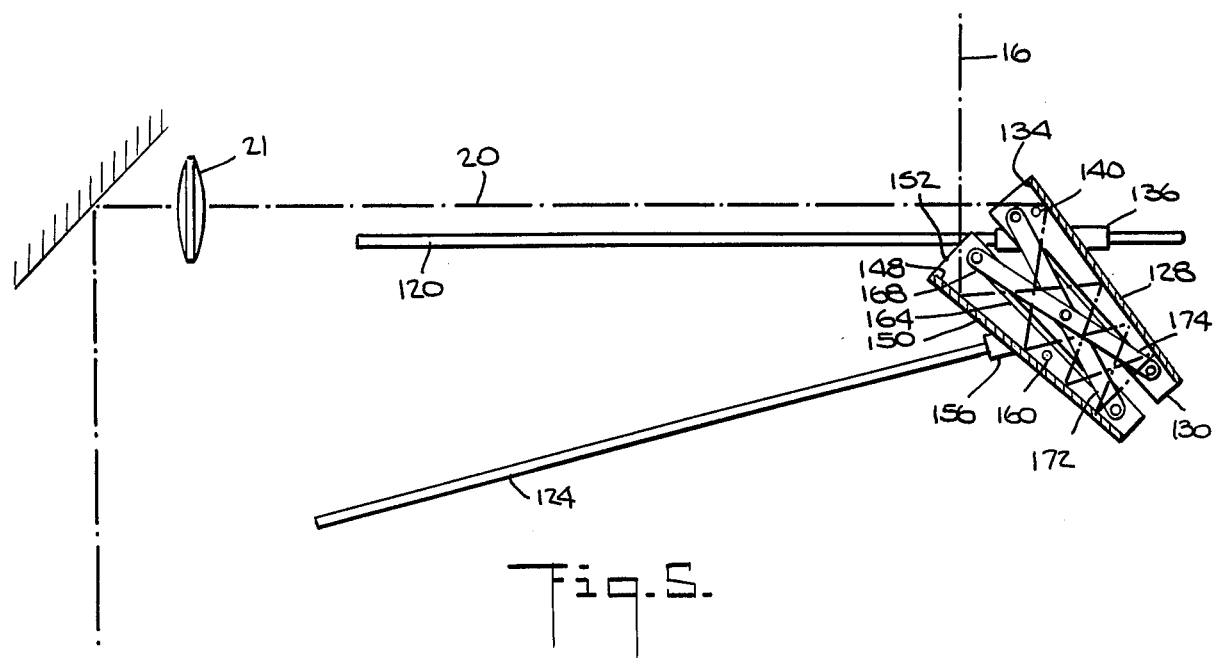
FIG. 5 is a vertical sectional view of a second embodiment of the instant invention showing the mirrors close together at the beginning of a cycle.
Figure 6:
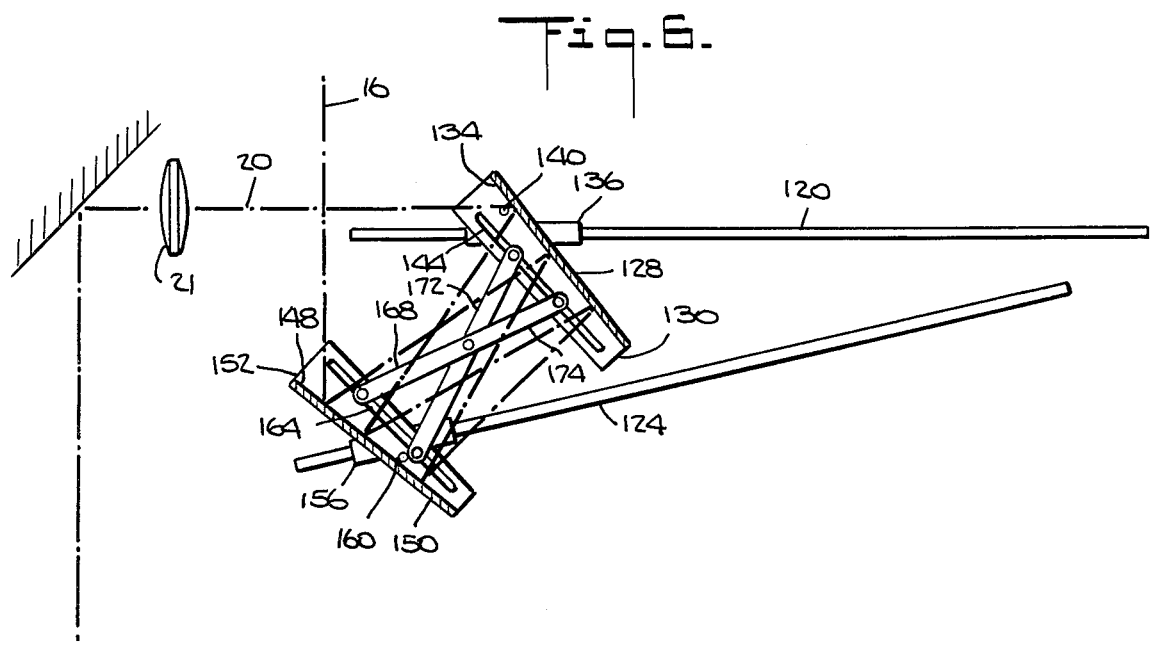
FIG. 6 is the same as FIG. 5 except it shows the mirrors further apart at the end of the cycle.

A second embodiment of the instant invention is seen in FIGS. 5-7, in which there is seen a pair of horizontal rods 120 and 122 and a second pair of angled rods 124 and 126, all of which are supported by conventional means not shown. An upper rectangular plate 128 having flanges 130 and 132 and supporting a mirror 134 on its underside rides on the horizontal rods 120 and 122 by means of a pair of bearings 136 and 138 which are secured through a pair of pins 140 and 142 respectively to the flanges 130 and 132 respectively of the plate 128. The flanges 130 and 132 each include parallel slots 144 and 146 respectively which are discussed in greater detail hereinbelow.

A second mirror 148 is secured to the top side of a second rectangular plate 150 having a pair of flanges 152 and 154. The second rectangular plate 150 rides on the angled rods 124 and 126 by means of a pair of bearings 156 and 158 which are secured through a pair of pins 160 and 162 respectively to the flanges 152 and 154 of the plate 150. The flanges 152 and 154 each include parallel slots 164 and 166.

The two mirrors 134 and 148 are connected with each other through a pair of scissor jacks 168 and 170 having pivotable legs 172 and 174, and 176 and 178 respectively. The legs 172 and 174 both have ends which ride in the slot 144 as well as ends which ride in the slot 164, while the legs 176 and 178 have ends which ride in the slot 146 as well as ends which ride in the slot 166.

In operation of the second embodiment, the two opposing mirrors 134 and 148 are spaced relatively close together at the beginning of a cycle as seen in FIG. 5. The upper mirror 134 is then caused to be translated along the horizontal rods 120 and 122 to the left to the position shown in FIGS. 6 and 7 by conventional means (not shown). The motion of the mirror 134 drives the mirror 148 along the angled rods 124 and 126 and the scissor jacks 168 and 170 open up simultaneously by sliding in the parallel slots 144, 146, 164 and 166 to permit the mirrors 134 and 148 to separate while maintaining the correct angular relationship.

Referring now to the first embodiment shown in FIGS. 2-4, the optical path length is defined as the distance from the point at which the input ray 16 first strikes the mirror 10 to the lens 21. The mirrors 10 and 12, in the course of moving about 9.25 inches from right to left, separate a distance of about two inches, with the path length being about 10.7 inches, to provide a path length to separation ratio of approximately 5.35:1, which demonstrates that a great distance of mirror travel can be compensated for with a relatively small change in mirror separation. The same results are obtained as well with the embodiment shown in FIGS. 5-7.

It will be understood by those skilled in the art that various changes in form and details may be made therein without departing from the spirit and scope of the present invention.

What is claimed is:

1. A multi-bounce, folded path scanning system, comprising:
   a first and second pair of stationary tracks, said second pair of tracks being angled with respect to said first pair of tracks;
   a movable carriage slidably mounted on said first pair of stationary tracks;
   a first mirror fixedly mounted on said movable carriage;
   a second mirror slidably mounted on said second pair of stationary tracks and opposing said first mirror and forming an acute angle therewith, said mirrors being separated by a predetermined distance, whereby one end of said mirrors is more open than the other end of said mirrors;
   means for directing an input light ray into the more open end of said mirrors such that said input light ray is incident upon said first mirror at a predetermined angle, wherein said ray is reflected off each mirror a predetermined multiplicity of times and exits said mirrors at the more open end; and
   means for translating said first and second mirrors, wherein the predetermined distance between the mirrors increases as the mirrors are translated while the correct angular relationship between the mirrors is maintained.

2. The system of claim 1, additionally comprising a third pair of tracks parallel to and below said first pair of tracks, and a fourth pair of tracks parallel to and below said second pair of tracks, wherein said movable carriage is slidably mounted on said first and third pairs of tracks, and said second mirror is slidably mounted on said second and fourth pairs of tracks.

3. The system of claim 2, wherein said movable carriage includes a pair of angled arms having slots therein, and said second mirror is slidably mounted in said pair of slots.

4. The system of claim 1, wherein said first and second mirrors are each mounted on plates having flanges extending from either side thereof, said flanges having slots therein parallel to each other, and additionally comprising a pair of scissor jacks slidably mounted in said slots.

* * * * *